G. O. STUCK.
AUTOMOBILE BODY.
APPLICATION FILED JUNE 10, 1916.
1,228,257.
Patented May 29, 1917.
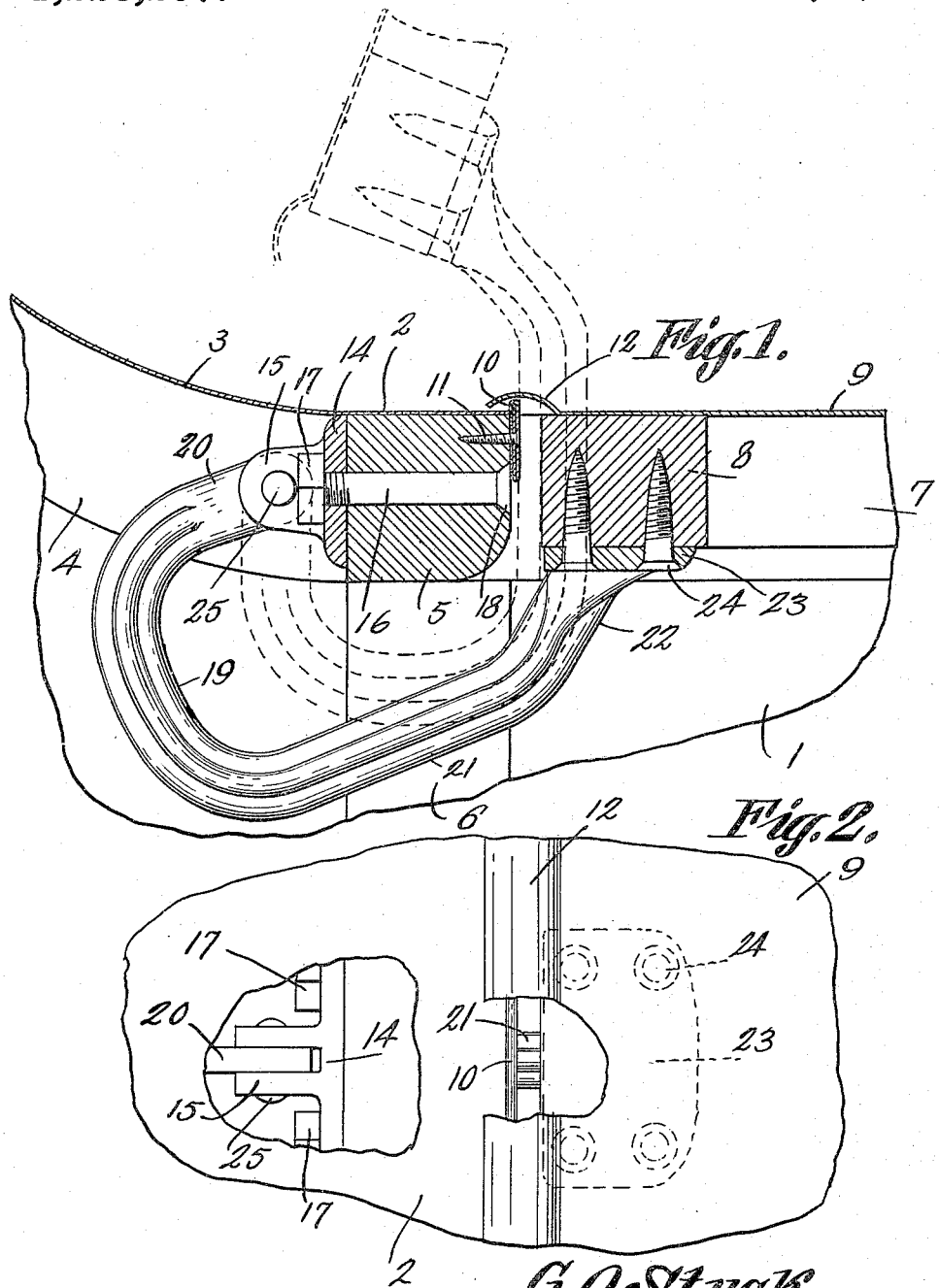
Witnesses
G. O. Stuck, Inventor
by C. A. Snow & Co.
Attorneys

UNITED STATES PATENT OFFICE.

GEORGE O. STUCK, OF UNION CITY, INDIANA.

AUTOMOBILE-BODY.

1,228,257.  Specification of Letters Patent.  Patented May 29, 1917.

Application filed June 10, 1916. Serial No. 102,940.

*To all whom it may concern:*

Be it known that I, GEORGE O. STUCK, a citizen of the United States, residing at Union City, in the county of Randolph and State of Indiana, have invented a new and useful Automobile-Body, of which the following is a specification.

The device forming the subject matter of this application is an automobile body, and one object of the invention is to provide novel means whereby water flowing down an inclined deck, constituting a part of the body, will be prevented from running into a lid-covered opening in the body.

A further object of the invention is to provide novel means carried by the lid, whereby the opening in which the lid moves will be shielded, so that water cannot flow therethrough.

Another object of the invention is to provide novel means for hingedly mounting the lid from the interior of the structure, the construction being such that the lid may be moved readily to an open position.

Another object of the invention is to provide a novel form of hinge mechanism for the lid, the construction being such that the timbers of the automobile body may be made relatively light.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in vertical longitudinal section, a portion of an automobile body whereunto the device forming the subject matter of this application has been applied; and Fig. 2 is a top plan of the structure shown in Fig. 1, parts being broken away.

In the accompanying drawings, there is shown a part of the rear upper portion of an automobile body, and the numeral 1 indicates a side wall constituting a part of the body. At 2 there appears a deck which is downwardly and rearwardly inclined, toward the back end of the vehicle, as shown at 3, in some instances. The deck 2 may be supported on side beams 4 and on a horizontal cross beam 5 carried by uprights 6 located at the sides of the vehicle. The construction above outlined may be changed without jeopardizing the utility of the invention.

The deck 2 is provided, as is common, with an opening controlled by a vertically swinging lid including, sometimes, side bars 7 and embodying, in any event, a front cross bar 8, the parts 7 and 8 defining a frame on which is superposed a top 9, ordinarily made out of metal. The front edge of the top 9 of the lid projects beyond the front edge of the cross bar 8 of the lid, and is upwardly arched, to form a lip 12 bridging the space between the front cross bar 8 and the cross beam 5. Owing to the presence of the lip 12, water cannot find its way into the interior of the vehicle body, between the parts 5 and 8. The rear edge of the deck 2 is bent upon itself to form an upright rib 10. A part of this rib 10 projects above the deck 2 and prevents water from running down the deck, into the body of the vehicle. The rib 10 is housed beneath the lip 12 and is shielded thereby, the rib presenting no unsightly appearance. The lower portion of the rib 10 bears against the rear face of the cross beam 5 and may be attached thereto by securing elements 11.

Duplicate hinge mechanisms are provided for assembling the lid with the cross beam 5. These hinge mechanisms ordinarily are located adjacent the sides of the vehicle, and since they are duplicates, but one of them will be described.

A supporting plate 14 is applied to the vertical forward face of the cross beam 5 and is held thereto by securing elements 16 which may be stove bolts, carrying nuts 17 which engage the plate 14. The depending part of the rib 10 preferably engages the heads 18 of the stove bolts 16 to hold the stove bolts in place. The supporting plates 14 are provided with upright, forwardly extended parallel ears 15 receiving a pivot element 25. The invention contemplates the use of hook-shaped hinge member 19 including an upper end 20 and a straight intermediate portion 21 disposed parallel to the end 20, the straight intermediate portion 21 terminating in an upwardly inclined extension 22. The end 20 of the hinge member 19 lies between the ears 15 of the plate 14 and is mounted to swing vertically on the pivot element 25. The forward extension 22 is held to the under face of the front cross bar 8 of the lid by means of screws 24 passing through a foot 23 on the end of the part 22. Thus when the lid is swung to an open position as indicated in dotted line in Fig. 1, the straight intermediate portion 21 of the hinge member 19 coacts with the cross beam 5 to limit the opening movement of the lid. When the lid is swung to an open position, it is raised vertically. A vertical raising of the lid is necessary, because the deck 2 frequently is inclined as shown at 3, or to a greater extent. A vertical raising of the lid is necessary, further, because the lid includes the lip 12.

Owing to the specific form of hinge used, the timbers whereunto the hinge is connected may be made relatively light.

Having thus described the invention, what is claimed is:—

A vehicle body comprising a deck having an opening; a cross beam supporting the deck, the rear edge of the deck being upwardly extended to form a water-deflecting rib integral with the deck and being downwardly extended to form a flange engaging the rear face of the cross beam; a lid for the opening and including a plate prolonged to form a lip overhanging the rib; a support abutting against the forward face of the cross beam; a securing element engaged with the cross beam and with the support, the flange engaging one end of the securing element to hold the same in the cross beam; and a hook-shaped hinge located within the body, the forward end of the hinge being pivoted to the support, and the rear end of the hinge being secured to the lid.

In testimony that I claim the foregoing as my own, I have hereto affixed my signature in the presence of two witnesses.

GEORGE O. STUCK.

Witnesses:
CLARENCE O. STUCK,
IRA VERNON.